C. BLIEBERGER.
APPARATUS FOR RECORDING, REPRODUCING, AND AMPLIFYING SOUND.
APPLICATION FILED SEPT. 20, 1919. RENEWED DEC. 23, 1921.

1,425,505.

Patented Aug. 15, 1922.
5 SHEETS—SHEET 1.

Inventor.
Charles Blieberger
By Joel B. Liberman
Attorney.

C. BLIEBERGER.
APPARATUS FOR RECORDING, REPRODUCING, AND AMPLIFYING SOUND.
APPLICATION FILED SEPT. 20, 1919. RENEWED DEC. 23, 1921.
1,425,505.
Patented Aug. 15, 1922.
5 SHEETS—SHEET 4.
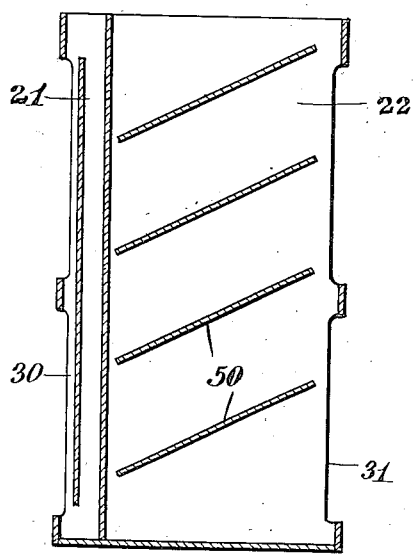
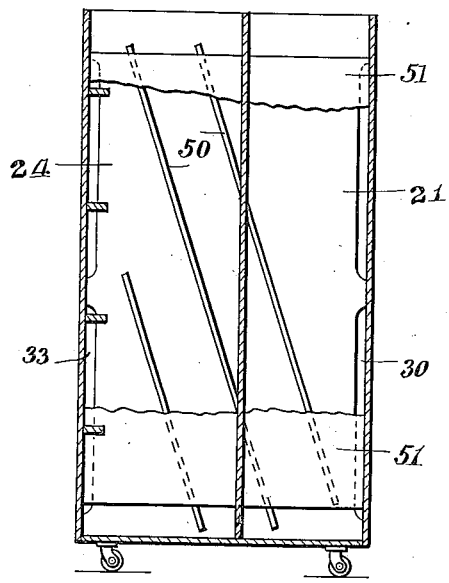
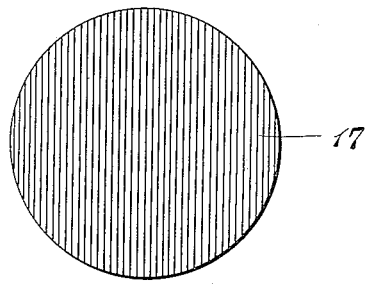
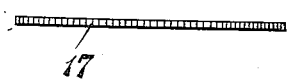
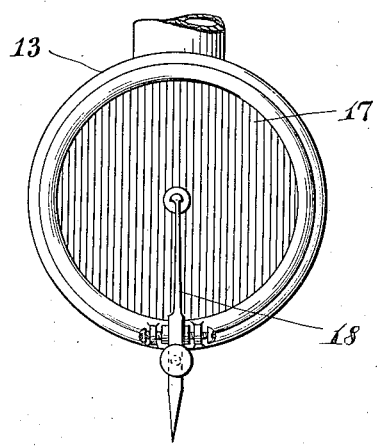
Inventor.
Charles Blieberger
By Joel B. Lieberman
Attorney.

C. BLIEBERGER.
APPARATUS FOR RECORDING, REPRODUCING, AND AMPLIFYING SOUND.
APPLICATION FILED SEPT. 20, 1919. RENEWED DEC. 23, 1921.

1,425,505.

Patented Aug. 15, 1922.
5 SHEETS—SHEET 5.

Inventor
Charles Blieberger
By Jacob Lieberman
Attorney.

UNITED STATES PATENT OFFICE.

CHARLES BLIEBERGER, OF NEW YORK, N. Y., ASSIGNOR TO A. ALEXANDER THOMAS, OF NEW YORK, N. Y.

APPARATUS FOR RECORDING, REPRODUCING, AND AMPLIFYING SOUND.

1,425,505.　　　　　Specification of Letters Patent.　　Patented Aug. 15, 1922.

Continuation of application Serial No. 241,624, filed June 24, 1918. This application filed September 20, 1919, Serial No. 325,256. Renewed December 23, 1921. Serial No. 524,507.

*To all whom it may concern:*

Be it known that I, CHARLES BLIEBERGER, a citizen of the United States, residing at New York city, New York, have invented a new and useful Improvement in Apparatus for Recording, Reproducing, and Amplifying Sound.

This invention relates to apparatus for the recording, reproduction and amplification of sound.

The basic principle of my invention involves a series of what I may call sound-developing compartments communicating with a sound-receiving chamber into which the sound vibrations to be amplified are suitably introduced. In the preferred form of my invention the sound-developing compartments communicate not only with the sound-receiving chamber, but also with each other through openings of suitable size and arrangement. As the sound enters the receiving-chamber it spreads freely in all directions into the sound-developing compartments, through which it passes to the outer air. When my invention is applied to a talking machine, I prefer to construct the sound-developing chambers of different volume.

When my invention is used for recording sound, the sound is introduced from the outer air into the compartments and chamber, whence the sound waves are directed to a suitable recording device.

My invention is characterized by the absence of the usual horn or megaphone found in prior phonograph constructions and which has the objection that it imparts to the tones a harsh, unnatural quality. This "phonograph-y" sound (if I may use that term) is so familiar to us that we can recognize the peculiar tones of a phonograph or talking machine at a distance. It is well known that sounds sent through a horn or similar amplifier issue out of it in different quality from the original. In other words, they are changed. There is, for instance, the familiar example of a man talking through a megaphone: the voice issuing out of it is not his natural voice. This explains, in a simple way, the fundamental objection to phonographs using a horn to amplify the sound. Now, in my invention, the old amplifying horn or megaphone is entirely done away with, and the sound waves pour out of the tone arm into a series or cluster of intercommunicating chambers, in which they freely spread and develop in all directions, thus faithfully reproducing the original tones.

In the following specification, the invention is described in its application to sound reproduction in talking machines, but the applicability of the apparatus to any recording or reproducing device will be apparent to all skilled in the art. The invention is intended to be applicable to all aural vibratory apparatus when it is desired to secure volume and tone so that each original tone is faithfully recorded or reproduced, as the case may be.

This is accomplished by the employment of suitable sound-developing chambers or compartments, adapted to receive or transmit tones from or to a main receiving chamber. I also may employ a wooden diaphragm in the sound box or other recording or reproducing means, but that is not necessary and any suitable diaphragm may be used.

The nature of the invention will be best understood when described in connection with the accompanying drawings, in which the invention is explained in terms of a talking machine of the cabinet type.

Figs. 4 to 6 and 8 to 13 are sections taken on the various corresponding lines of Fig. 3 of the drawings, and looking, in each instance, in the direction of the arrows.

Fig. 14 is a face view of my improved diaphragm; and Fig. 15 is an edge view thereof.

Fig. 16 is a view showing the diaphragm as embodied in a sound box.

Similar characters of reference designate corresponding parts throughout the several views.

Figure 1:
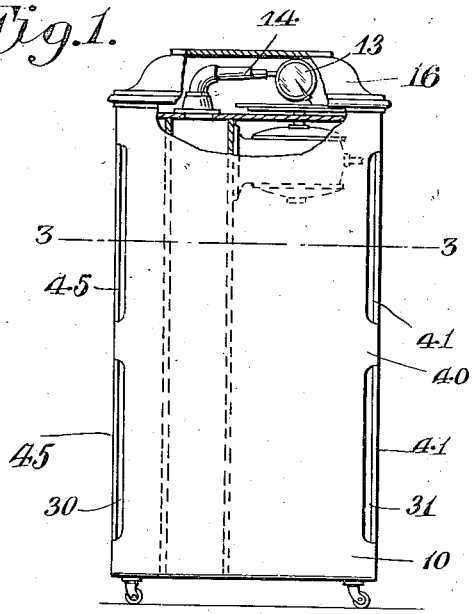
Fig. 1 shows a talking machine of the cabinet type, having a portion broken away to disclose the interior.
Figure 2:
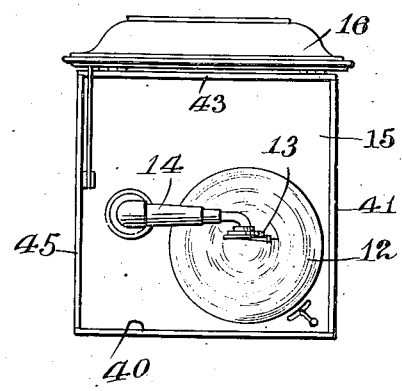
Fig. 2 is a plan thereof with the cover portion in raised position.
Figure 3:
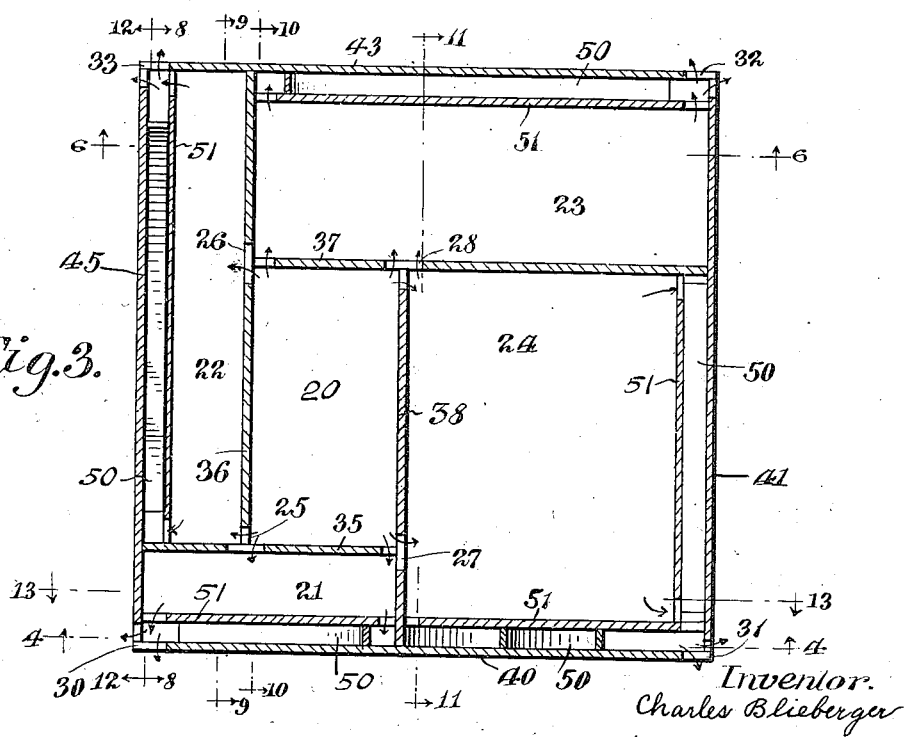
Fig. 3 is an enlarged cross-sectional view taken on the line 3—3, Fig. 1, looking downwardly.
Figure 4:
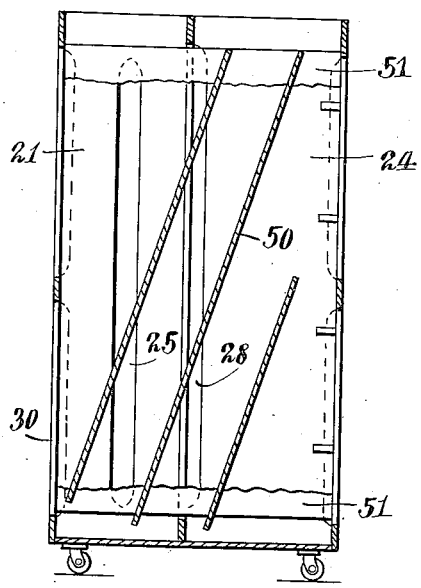
Figure 5:
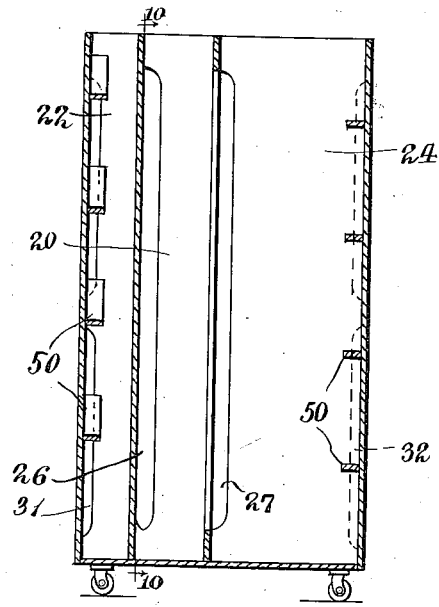
Figure 6:
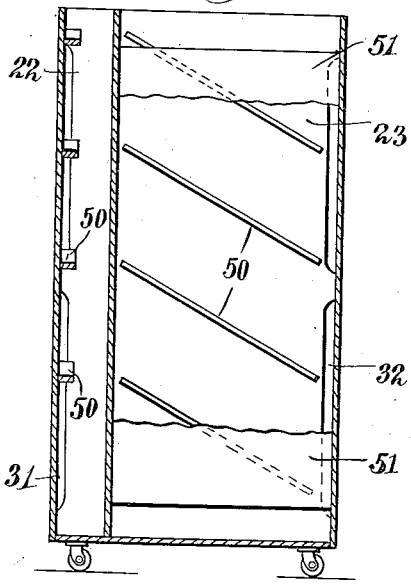
Figure 7:
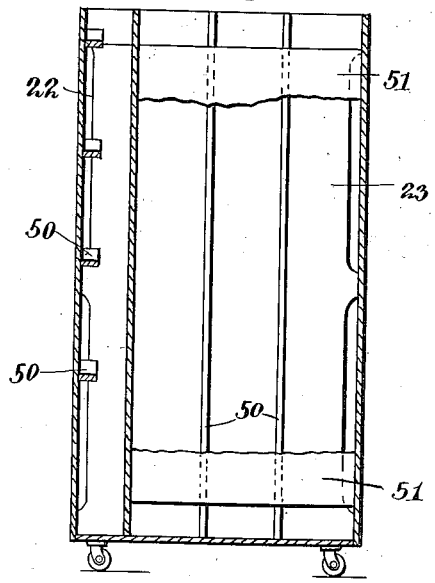
Fig. 7 is a sectional view similar to Fig. 6, but illustrating a modification.
Figure 8:
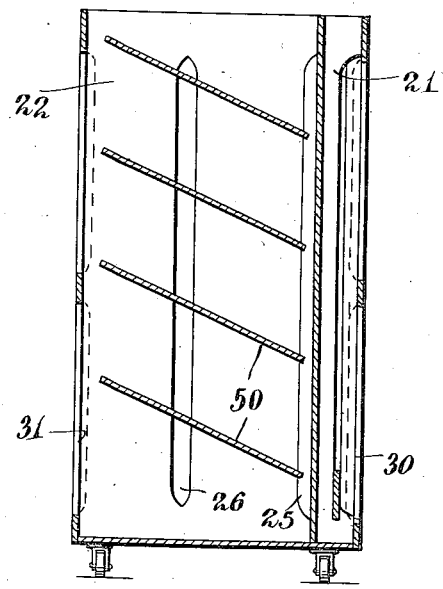
Figure 9:
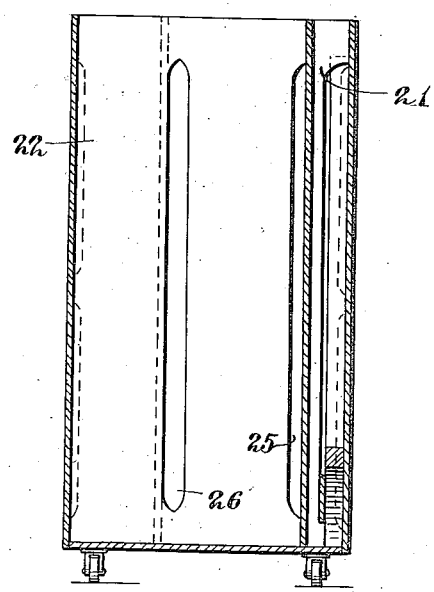
Figure 10:
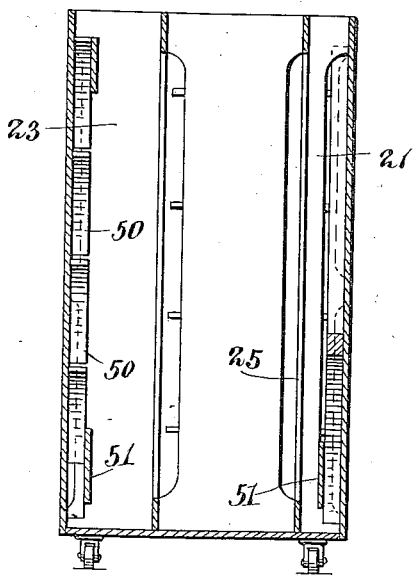
Figure 11:
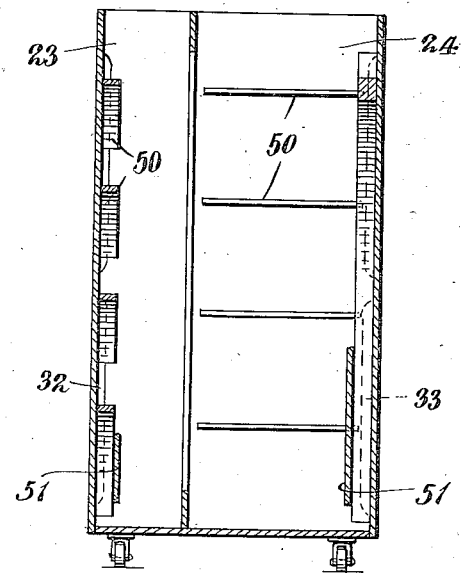

Referring to the drawings, 10 designates a suitable cabinet constructed as hereinafter more fully disclosed, and carrying at its upper portion the usual phonograph mechanism, including a motor 11, turn-table 12, sound box 13 and tone arm 14, all of any well-known construction, the same forming no particular part of the present invention. This mechanism rests upon and is carried by a suitable top or motor board 15, and the cabinet may be closed by means of a cover 16, all of which is well understood and common in the art.

Considering now more especially the specific construction and arrangement of the compartments shown by way of illustration in Figs. 3 to 13 of the drawings, it will be noted that the tone arm 14 flares outwardly and opens directly into a compartment 20 which is surrounded by, or has adjacent thereto a plurality of sound compartments 21, 22, 23 and 24, which I may conveniently designate as sound-developing compartments.

Figure 17:
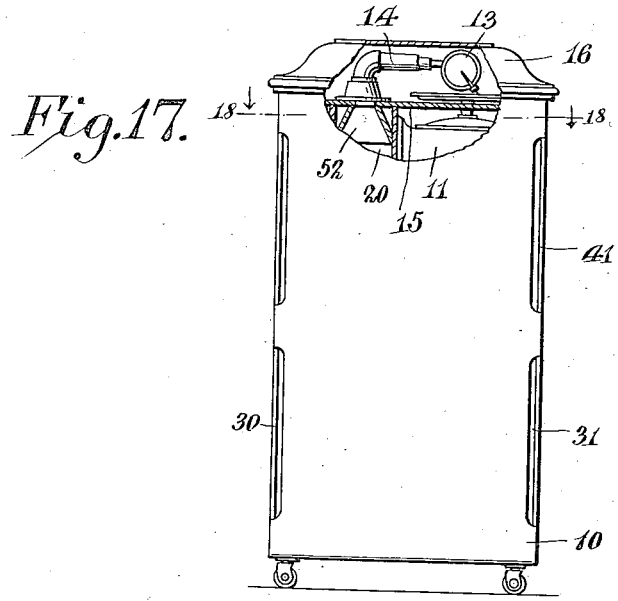
Fig. 17 is a talking machine of the cabinet type, broken away to show a modification introducing the concealed horn.

Compartment 20 is the sound receiving chamber and may directly receive the sound waves from the opening in the tone arm as in Fig. 1 or it may receive them from a continuation of the tone arm, as in Fig. 17. I have obtained excellent results in the first manner and claim as one of the modifications of my invention the use of a sound reproducing apparatus without the employment of a horn or funnel. It should be understood, however, that my apparatus can be used with or without the tone arm extension. The funnel-shaped extension 52 is not for amplifying the sound, but when used at all, is merely an aid in directing the sound waves into the chamber 20. Compartment 20 is in communication with each of the compartments 21, 22, 23 and 24, as through longitudinal openings 25, 26, 27 and 28 at the respective corners of said compartments. It will be seen that the openings 25, 26, 27 and 28 also afford communication between the compartments 21, 22, 23 and 24, thereby allowing a more ready circulation and development of the sound waves in these compartments. I mention this as a preferred construction, and not as an indispensable feature.

The openings 25, 26, 27 and 28 may vary in size, location and shape, and they might be covered with some suitable material, as long as they are capable of transmitting the sound to the developing compartments above mentioned. The last-named compartments, in turn, communicate freely with the outside atmosphere through suitable openings, such as 30, 31, 32, and 33. Compartment 21, as shown, contains the smallest volume of air space, the respective compartments 22, 23 and 24 increasing in volume. I have found this arrangement of compartments particularly suitable for use in talking machines or phonographs.

The inner walls of the compartments 21 to 24 are here shown as extensions of the walls 35, 36, 37 and 38 of compartment 20, although this form is for convenience of construction only and may vary.

The outer walls 40, 41, 43 and 45 of the cabinet are suitably joined, as shown in Figs. 1 and 17, with spaces allowing a passage of air at 30, 31, 32 and 33. These outer vents need not be of the form shown but can be of any size, location and construction. It will be noted, also, that the volume of the respective compartments 21, 22, 23 and 24 is progressively increasing from treble to bass.

Figure 18:
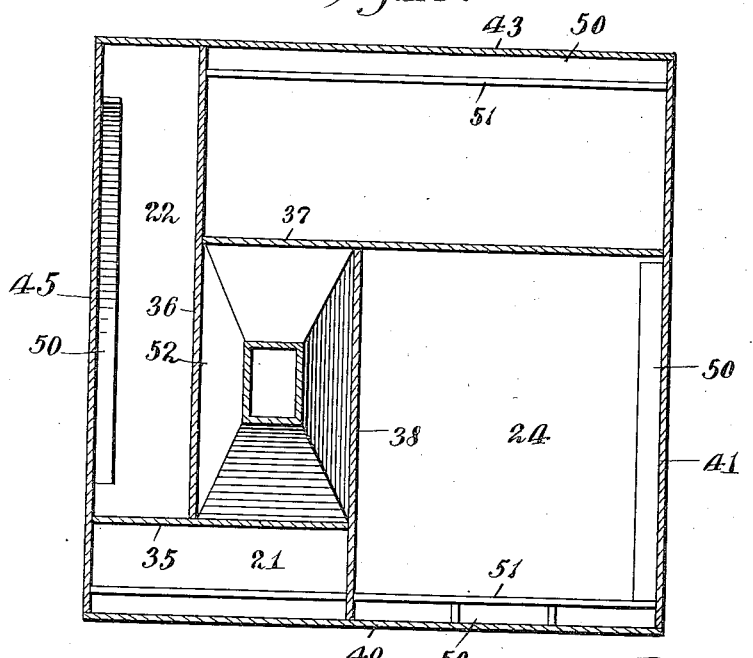
Fig. 18 is a section on line 18 of Fig. 17.

I have found that by providing the compartments 21, 22, 23 and 24, preferably but not necessarily all of them, with additional panels 51, the sound vibrations are accentuated, particularly the violin and piano portions. The panels, which are preferably of resonating material, are secured to the inner side of the outer walls 40, 41, 43 and 45, and are held slightly spaced therefrom, as may be seen from Figs. 3 and 18, by any suitable means, such as bars 50. Any other practical securing and spacing means for the panels 51 may be employed. In using bars 50, it is preferable to arrange them substantially parallel to one another.

By means of the construction hereinbefore described, the reproduction of the sound waves is most faithfully developed, resulting in naturalness of tone, whether it be of the human voice or of the ensemble effects of a symphony orchestra.

The material of which the different parts are composed may be varied. The inner walls 35, 36, 37 and 38 are preferably made of resonant material, such as spruce or pine, or other coniferous wood, but they are not necessarily made of a resonant material. Effects of different instruments are accentuated by the use of different woods and combinations of resonating and non-resonating materials. With my apparatus the distance or proximity of the listener from the machine does not interfere or detract from the beauty and volume of the tone.

Any suitable or desired construction of sound-box, of which there are many in the market, may be used with my apparatus when the same is operated as a phonograph. Personally, I prefer a sound-box in which the diaphragm 17 (Figures 14–16) is made of a suitable wood, with the grain running substantially parallel to the longitudinal axis of the stylus arm 18. However, no particular type of sound-box is necessary, this being merely a matter of personal taste or preference.

I have only shown four compartments as above set forth, but claim any plurality of compartments when used with a receiving chamber as set forth. The mechanical construction and arrangement of the walls, outlets and cabinet are not material to the invention. Obviously, variations in design or construction are permitted to adapt the structure to the use intended, as long as the principles of the invention are adhered to, that is, a sound receiving chamber communicating with sound-developing compartments, such compartments communicating with the outer air. In recording mechanisms I have found it advisable to remove the base of the cabinet so as to permit a greater free passage for the entry of the sound into the developing chambers.

When I refer to my invention as a recording and reproducing apparatus, I do not mean that it shall necessarily be used for both operations, but simply that it may be used either for recording or for reproducing, as desired. Of course, when my new compartment construction is employed in recording, it will be understood that additional mechanism is connected therewith—such as a vibratory diaphragm adapted to be actuated by the sounds to be recorded, a recording plate and a recording stylus arranged to operate over said plate in accordance with the vibrations of the diaphragm. As such additional mechanism forms no part of my present invention, I have not considered it necessary to show or describe the same.

This application is a continuation of my pending application, Serial Number 241,624, filed June 24, 1918.

Having described my invention what I claim is:

1. In apparatus for recording and reproducing sound, walls forming a sound receiving chamber, and walls forming a plurality of adjacent sound-developing compartments, the receiving chamber having means of communication with the adjacent compartments and said compartments having means of communication with the outer air.

2. In apparatus for recording and reproducing sound, a cabinet having walls forming a sound receiving chamber, such walls being extended to form with the outer walls of the cabinet a plurality of sound-developing compartments adapted to communicate with said chamber and with the outer air.

3. In apparatus for recording and reproducing sound, walls forming a sound receiving chamber, and walls forming a plurality of adjacent sound-developing compartments of different volume communicating with the receiving chamber, such compartments having means permitting the passage of sound to and from the outer air.

4. A cabinet for talking machines, comprising outer walls having sound openings therein, walls arranged within said cabinet to form a chamber for receiving sound waves from the sound box of a talking machine, and walls forming a plurality of compartments around said chamber, said compartments being in communication with said chamber and with each other, said compartments being open to the outer air through said sound openings in the outer walls.

5. A cabinet for talking machines, comprising outer walls having sound openings therein, walls arranged within said cabinet to form a chamber for receiving sound waves from the sound box of a talking machine, and walls forming a plurality of compartments of progressively increasing volume around said chamber, said compartments being in communication with said chamber and with each other, said compartments being open to the outer air through said sound openings in the outer walls.

6. A cabinet for talking machines, comprising walls forming a receiving chamber to receive sound waves delivered from the sound box of a talking machine, and walls forming a plurality of adjacent compartments communicating with the receiving chamber and with the outer air, some or all of said compartments being provided with panels slightly spaced from the outer walls of said cabinet.

7. In sound-transmitting apparatus, walls forming a sound-receiving chamber, walls forming a plurality of adjacent sound compartments, said first and second mentioned walls having openings whereby said adjacent compartments communicate with each other and with said chamber, said compartments also communicating with the outer air, and resonant panels within said sound compartments, said panels being secured to and slightly spaced from the outer walls of said compartments.

8. A sound-transmitting cabinet comprising outer walls and a plurality of inner walls arranged substantially parallel with said outer walls to form a series of sound compartments, said inner walls having openings whereby said compartments are in communication with each other and with the outer air.

9. A sound-transmitting cabinet comprising outer walls and a plurality of inner walls arranged substantially parallel with said outer walls to form a series of sound compartments of different volume, said inner walls having openings whereby said compartments are in communication with each other and with the outer air.

10. In sound-amplifying apparatus, walls arranged to form a sound-receiving chamber, and other walls arranged to form a plurality of sound compartments in communication with each other and with said chamber, said compartments being open to the outer air.

11. In sound-amplifying apparatus, walls arranged to form a sound-receiving chamber, and other walls arranged to form with said first-mentioned walls a plurality of sound compartments in communication with each other and with said chamber, said compartments being open to the outer air.

12. In sound-amplifying apparatus, walls arranged to form a sound-receiving chamber, other walls arranged to form a plurality of sound compartments in communication with each other and with said chamber, said compartments being open to the outer air, and resonant panels adjacent said other walls.

CHARLES BLIEBERGER.

Witnesses:
D. P. BERGHEIMER,
ANNA ANDERSON.